US012802001B2

(12) United States Patent
Moreira Da Silva Eira Leitão et al.

(10) Patent No.: US 12,802,001 B2
(45) Date of Patent: Nov. 17, 2026

(54) MACHINE-LEARNING METHOD FOR AUTOMATIC INSTANCE ASSIGNMENT UNDER FAIRNESS AND CAPACITY CONSTRAINTS

(71) Applicant: FEEDZAI—CONSULTADORIA E INOVAÇÃO TECNOLÓGICA, S.A., Coimbra (PT)

(72) Inventors: Diogo Moreira Da Silva Eira Leitão, Coimbra (PT); Pedro Dos Santos Saleiro, Coimbra (PT); Pedro Gustavo Santos Rodrigues Bizarro, Coimbra (PT)

(73) Assignee: FEEDZAI—CONSULTADORIA E INOVAÇÃO TECNOLÓGICA, S.A, Coimbra (PT)

( * ) Notice: Subject to any disclaimer, the term of this patent is extended or adjusted under 35 U.S.C. 154(b) by 475 days.

(21) Appl. No.: 18/538,354

(22) Filed: Dec. 13, 2023

(65) Prior Publication Data

US 2024/0193489 A1 Jun. 13, 2024

(30) Foreign Application Priority Data

Dec. 13, 2022 (PT) ........................................ 118391

(51) Int. Cl.
*G06N 20/20* (2019.01)
*G06F 17/16* (2006.01)
(Continued)

(52) U.S. Cl.
CPC ............ *G06N 20/20* (2019.01); *G06F 17/16* (2013.01); *G06N 3/045* (2023.01); *G06N 3/08* (2013.01);
(Continued)

(58) Field of Classification Search
CPC ........ G06N 20/20; G06N 3/045; G06N 3/084; G06N 3/091; G06N 3/088; G06N 20/10;
(Continued)

(56) References Cited

U.S. PATENT DOCUMENTS

2023/0205839 A1* 6/2023 Wu ......................... G06F 17/18 703/2

OTHER PUBLICATIONS

David et al (NPL "Predict Responsibly: Improving Fairness and Accuracy by Learning to Defer" Published 2018 by 32nd Conference on Neural Information Processing Systems (NeurIPS 2018), Montréal, Canada . . . Total 11 pages (Year: 2018).*

(Continued)

*Primary Examiner* — Quoc A Tran
(74) *Attorney, Agent, or Firm* — Leason Ellis LLP

(57) ABSTRACT

A computer-implemented machine-learning training method and system are provided. Training instance(s) can be input to a first machine-learning model and, in response, for each instance, classification prediction output(s) and error prediction output(s) received, which can include an output representing one or more of a false-negative, a false-positive, a true-negative, and a true-positive. The instance(s), classification prediction output(s), and identifier(s) are input to a second machine-learning model and, in response, a predicted error output that includes one or more of a predicting false-negative, a false-positive, a true-negative, and a true-positive. The training instance(s) are assigned to the constraint-unlimited machine-learning classifier or the one or more constraint-limited classifiers, thereby minimizing the composite loss function.

20 Claims, 10 Drawing Sheets

(51) Int. Cl.
*G06N 3/045* (2023.01)
*G06N 3/08* (2023.01)
*G06N 3/084* (2023.01)
*G06N 3/086* (2023.01)
*G06N 3/088* (2023.01)
*G06N 3/091* (2023.01)
*G06N 20/10* (2019.01)
*G06Q 10/06* (2023.01)

(52) U.S. Cl.
CPC ............ *G06N 3/084* (2013.01); *G06N 3/086* (2013.01); *G06N 3/088* (2013.01); *G06N 3/091* (2023.01); *G06N 20/10* (2019.01); *G06Q 10/06* (2013.01)

(58) Field of Classification Search
CPC .......... G06N 3/08; G06N 3/086; G06F 17/16; G06Q 10/06
See application file for complete search history.

(56) References Cited

OTHER PUBLICATIONS

Jessie et al (NPL "Bridging Machine Learning and Mechanism Design towards Algorithmic Fairness" Published 2021 by ACM . . . Total 15 pages (Year: 2021).*
Akiba, Takuya, et al. "Optuna: A next-generation hyperparameter optimization framework." Proceedings of the 25th ACM SIGKDD international conference on knowledge discovery & data mining. Jul. 2019; 10 pages.
Angwin, Julia, et al. "Machine bias risk assessments in criminal sentencing." ProPublica, May 2016, 16 pages.
Bamford, Steven P., et al. "Galaxy Zoo: The Dependence of Morphology and Colour on Environment" Monthly Notices of the Royal Astronomical Society, Mar. 2009, pp. 1324-1352.
Bao, Michelle, et al. "It's compaslicated: The messy relationship between rai datasets and algorithmic fairness benchmarks." arXiv preprint arXiv:2106.05498, Jun. 2021, 21 pages.
Barocas, Solon et al. "Big Data's Disparate Impact." 104 California Law Review 671, Sep. 2016, pp. 671-732.
Borisov, Vadim, et al. "Deep Neural Networks and Tabular Data: A Survey." IEEE transactions on neural networks and learning systems, Dec. 2022, pp. 1-21.
Breiman, Leo, "Random Forests." Machine learning 45, Oct. 2001, pp. 5-32.
Buolamwini, Joy et al. "Gender Shades: Intersectional Accuracy Disparities in Commercial Gender Classification." Conference on Fairness, Accountability and Transparency, Feb. 2018, New York, NY, USA (Proceedings of Machine Learning Research, vol. 81), PMLR, 15 pages.
Charusaie, Mohammad-Amin, et al. "Sample Efficient Learning of Predictors That Complement Humans." International Conference on Machine Learning, ICML 2022, Jul. 17-23, 2022, Baltimore, Maryland, USA (Proceedings of Machine Learning Research, vol. 162), PMLR, 34 pages.
Chen, Tianqi et al. "XGBoost: A Scalable Tree Boosting System." Proceedings of the 22nd ACM SIGKDD International Conference on Knowledge Discovery and Data Mining, San Francisco, CA, USA, Aug. 13-17, 2016, ACM, pp. 785-794.
Chow, C. K. "On Optimum Recognition Error and Reject Tradeoff." IEEE Transactions on Information Theory vol. 16, No. 1, Apr. 1969, (35 pages).
Corbett-Davies, Sam, et al. "Algorithmic Decision Making and the Cost of Fairness." Proceedings of the 23rd ACM SIGKDD International Conference on Knowledge Discovery and Data Mining. Jun. 2017. 10 pages.
Corbière, Charles, et al. "Addressing Failure Prediction by Learning Model Confidence." Advances in Neural Information Processing Systems, vol. 32. Curran Associates, Inc., Oct. 2019, 12 pages.
Cortes, Corinna, et al. Learning with Rejection. In Algorithmic Learning Theory—27th International Conference, ALT 2016, Bari, Italy, Oct. 19-21, 2016, Proceedings (Lecture Notes in Computer Science, vol. 9925), 9 pages.
Davidson, Thomas, et al. "Automated Hate Speech Detection and the Problem of Offensive Language." Proceedings of the International AAAI Conference on Web and Social Media, vol. 11. May 2017, pp. 512-515.
De-Arteaga, Maria, et al.. "A Case for Humans-in-the-Loop: Decisions in the Presence of Erroneous Algorithmic Scores." Proceedings of the 2020 CHI Conference on Human Factors in Computing Systems. ACM, Honolulu HI USA, Apr. 2020, pp. 1-12.
Dellermann, Dominik, et al. "Hybrid Intelligence." Business & Information Systems Engineering 61, Mar. 2019, pp. 637-643.
Duda, Richard O., et al. "Pattern Classification." Wiley Hoboken; Nov. 2000, 39 pages.
Dwork, Cynthia, et al. "Fairness through Awareness." Proceedings of the 3rd Innovations in Theoretical Computer Science Conference. Nov. 2011, 24 pages.
Elkan, Charles. "The Foundations of Cost-Sensitive Learning." Proceedings of the Seventeenth International Joint Conference on Artificial Intelligence, vol. 17, Aug. 2001, 6 pages.
Gal, Yarin et al. :Dropout as a Bayesian Approximation: Representing Model Uncertainty in Deep Learning.: Proceedings of the 33nd International Conference on Machine Learning, ICML 2016, New York City, NY, USA, Jun. 19-24, 2016 (JMLR Workshop and Conference Proceedings, vol. 48), 10 pages.
Gama, João, et al. "A Survey on Concept Drift Adaptation." ACM computing surveys 46. Jan. 2013, 44 pages.
Goldbloom, Anthony, et al. "Heritage Health Prize", Kaggle, Oct. 2012, 12 pages.
Gopnik, Alison; et al. "Reconstructing Constructivism: Causal Models, Bayesian Learning Mechanisms, and the Theory Theory." Psychological Bulletin 138, 6, Nov. 2012, pp. 1085-1108.
Gorishniy, Yury, et al. "Revisiting Deep Learning Models for Tabular Data." Advances in Neural Information Processing Systems 34: Annual Conference on Neural Information Processing Systems 2021, Dec. 6-14, 2021, 12 pages.
Grinsztajn, Léo, et al. "Why Do Tree-Based Models Still Outperform Deep Learning on Tabular Data?" Advances in neural information processing systems 35, Dec. 2022, 14 pages.
Hardt, Moritz, et al. "Equality of Opportunity in Supervised Learning." Advances in Neural Information Processing Systems, vol. 29. Curran Associates, Inc. Oct. 2016, 9 pages.
Hein, Matthias, et al. "Why ReLU Networks Yield High-Confidence Predictions Far Away From the Training Data and How to Mitigate the Problem." IEEE Conference on Computer Vision and Pattern Recognition, CVPR 2019, Long Beach, CA, USA, Jun. 16-20, 2019. Computer Vision Foundation / IEEE, pp. 41-50.
Hemmer, Patrick, et al. "Forming effective human-AI teams: building machine learning models that complement the capabilities of multiple experts." arXiv preprint arXiv:2206.07948, Jun. 2022, 7 pages.
Hendrycks, Dan et al. "A Baseline for Detecting Misclassified and Out-of-Distribution Examples in Neural Networks." 5th International Conference on Learning Representations, ICLR 2017, Toulon, France, Apr. 24-26, 2017, Conference Track Proceedings. OpenReview.net. 12 pages.
Irvin, Jeremy, et al. "Chexpert: A Large Chest Radiograph Dataset with Uncertainty Labels and Expert Comparison." Proceedings of the AAAI Conference on Artificial Intelligence, vol. 33. Jul. 2019, pp. 590-597.
Jesus, M., et al. "How Can I Choose an Explainer? An Application-grounded Evaluation of Post-hoc Explanations." Proceedings of the 2021 ACM Conference on Fairness, Accountability, and Transparency, Virtual Event / Toronto, Canada, Mar. 3-10, 2021, ACM, 11 pages.
Jesus, Sérgio, et al. "Turning the Tables: Biased, Imbalanced, Dynamic Tabular Datasets for ML Evaluation." Proceedings of the Neural Information Processing Systems, NeurIPS Datasets and Benchmarks Dec. 2022, 13 pages.
Ke, Guolin, et al. "LightGBM: A Highly Efficient Gradient Boosting Decision Tree." Advances in Neural Information Processing Sys-

(56) References Cited

OTHER PUBLICATIONS tems 30: Annual Conference on Neural Information Processing Systems 2017, Dec. 4-9, 2017, 9 pages.
Keswani, Vijay, et al. "Designing Closed Human-in-the-loop Deferral Pipelines." arXiv preprint arXiv:2202.04718, Feb. 2020, 20 pages.
Keswani, Vijay, et al. Towards Unbiased and Accurate Deferral to Multiple Experts. In AIES '21: AAAI/ACM Conference on AI, Ethics, and Society, Virtual Event, USA, May 19-21, 2021, ACM, 28 pages.
Krizhevsky, Alex et al. "Learning Multiple Layers of Features from Tiny Images." https://www. cs. toronto. edu/kriz/learning-features-2009-TR, Apr. 2009, 60 pages.
Lake, Brenden M., et al. "Building Machines That Learn and Think like People." Behavioral and Brain Sciences 40, Nov. 2016, (58 pages).
Lakkaraju, Himabindu, et al. "The Selective Labels Problem: Evaluating Algorithmic Predictions in the Presence of Unobservables." Proceedings of the 23rd ACM SIGKDD International Conference on Knowledge Discovery and Data Mining, Halifax, NS, Canada, Aug. 13-17, 2017. ACM, pp. 275-284.
Lakshminarayanan, Balaji, et al. "Simple and Scalable Predictive Uncertainty Estimation Using Deep Ensembles." Advances in Neural Information Processing Systems, vol. 30. Curran Associates, Inc., Nov. 2017, 12 pages.
Larson, Jeff et al., "How We Analyzed the COMPAS Recidivism Algorithm." https://www.propublica.org/article/how-we-analyzed-thecompas-recidivism-algorithm, May 2016, 16 pages.
Madras, David, et al. "Predict Responsibly: Improving Fairness and Accuracy by Learning to Defer." Advances in Neural Information Processing Systems, vol. 31. Curran Associates, Inc., Sep. 2018, 11 pages.
Meehl, Paul E. "Clinical versus Statistical Prediction: A Theoretical Analysis and a Review of the Evidence.", Jan. 1954.
Meng, Xiangrui. "Scalable Simple Random Sampling and Stratified Sampling." International Conference on Machine Learning. PMLR, May 2013, 9 pages.
Mozannar, Hussein et al. "Consistent Estimators for Learning to Defer to an Expert." Proceedings of the 37th International Conference on Machine Learning, ICML 2020, Jul. 13-18, 2020, Virtual Event (Proceedings of Machine Learning Research, vol. 119). PMLR, 12 pages.
Niculescu-Mizil, Alexandru et al. "Predicting Good Probabilities with Supervised Learning." Machine Learning, Proceedings of the Twenty-Second International Conference (ICML 2005), Bonn, Germany, Aug. 7-11, 2005 (ACM International Conference Proceeding Series, vol. 119), ACM, 8 pages.
Okati, Nastaran, et al. "Differentiable Learning Under Triage." Advances in Neural Information Processing Systems, vol. 34. Curran Associates, Inc., Dec. 2021, 12 pages.
Peterson, Joshua C., et al. "Human Uncertainty Makes Classification More Robust." Proceedings of the IEEE/CVF International Conference on Computer Vision. Aug. 2019, pp. 9617-9626.
Raghu, Maithra, et al. "The Algorithmic Automation Problem: Prediction, Triage, and Human Effort.", Mar. 2019. arXiv:1903.12220, 20 pages.
Schrijver, Alexander, "Theory of Linear and Integer Programming." John Wiley & Sons, Jun. 1998, 484 pages.
Sheng, Victor S et al. "Thresholding for Making Classifiers Cost-sensitive." Proceedings, The Twenty-First National Conference on Artificial Intelligence and the Eighteenth Innovative Applications of Artificial Intelligence Conference, Jul. 16-20, 2006, Boston, Massachusetts, USA. AAAI Press, pp. 476-481.
Shwartz-Ziv, Ravid et al. "Tabular Data: Deep Learning Is Not All You Need." Nov. 2021. arXiv:2106.03253, 13 pages.
Tschandl, Philipp, et al. "The HAM10000 Dataset, a Large Collection of Multi-Source Dermatoscopic Images of Common Pigmented Skin Lesions." Scientific data 5, 1 , Aug. 2018, pp. 1-9.
Verma, Rajeev et al. "Calibrated Learning to Defer with Onevs-All Classifiers." International Conference on Machine Learning, ICML 2022, Jul. 17-23, 2022, Baltimore, Maryland, USA (Proceedings of Machine Learning Research, vol. 162), PMLR, 19 pages.
Wang, Xiaosong, et al. "Chestx-Ray8: Hospital-scale Chest x-Ray Database and Benchmarks on Weakly-Supervised Classification and Localization of Common Thorax Diseases." Proceedings of the IEEE Conference on Computer Vision and Pattern Recognition. Dec. 2017. pp. 2097-2106.
Xu, Lei, et al. "Modeling Tabular Data Using Conditional GAN." Advances in Neural Information Processing Systems, vol. 32. Curran Associates, Inc. Oct. 2019, 11 pages.
Zadrozny, Bianca et al. "Obtaining Calibrated Probability Estimates from Decision Trees and Naive Bayesian Classifiers." Proceedings of the Eighteenth International Conference on Machine Learning (ICML 2001), Williams College, Williamstown, MA, USA, Jun. 28-Jul. 1, 2001, 8 pages.

* cited by examiner

| | Month | | | | | | | |
|---|---|---|---|---|---|---|---|---|
| | 1 | 2 | 3 | 4 | 5 | 6 | 7 | 8 |
| **Main Classifier** | Training | | | Val | Deployment | | | |
| **Synthetic Experts** | Preprocessing | | | Deployment | | | | |
| **Assignment System** | | | | Training | | | | Test |

FIG. 5

MACHINE-LEARNING METHOD FOR AUTOMATIC INSTANCE ASSIGNMENT UNDER FAIRNESS AND CAPACITY CONSTRAINTS

CROSS-REFERENCE

This application claims the benefit of priority under 35 U.S.C. § 119(e) from Portugal Patent Application No. 118391, filed on Dec. 13, 2022, which is hereby incorporated by reference as if set forth in its entirety herein.

TECHNICAL FIELD

The present disclosure relates to a machine-learning method for automatic instance assignment under fairness and capacity constraints.

BACKGROUND

With the advent of machine learning (ML), artificial intelligence (AI) is now ubiquitous in decision-making processes. The success of ML can be attributed to its unique set of strengths. ML models are fast and scalable, being capable of processing and leveraging large volumes of information to output accurate predictions. Nevertheless, they are not without some relevant drawbacks. ML models are limited to the world view provided to them through the learning data, and may become obsolete in the face of changes in the data distribution. Moreover, state-of-the-art algorithms are effectively black boxes, lacking transparency on the reasoning behind each decision. In several applications with human and societal impact, ML models have been found to be inadvertently discriminating against underprivileged groups.

All these drawbacks of ML are inhibiting practitioners from fully automating some decision processes, especially in high-stakes applications. Furthermore, several authors argue that humans have complementary sets of strengths and weaknesses to those of AI. Humans are slow and limited in the amount of signals they can process. In the face of uncertainty, they have been shown to have inferior statistical accuracy to that of simple actuarial models. However, humans are less limited in their world view, and can seek additional information should they need it. Moreover, humans are capable of reasoning through causal relationships, which equips them to adapt to changes in the environment.

As a consequence of their complementary sets of strengths and weaknesses, an increasing body of research has been dedicated to building hybrid decision-making systems that include both humans and AI for optimal performance and fairness. A challenge is to determine who—among humans and AI—should decide in each case. Currently, many real-world systems use model uncertainty as the only criterion to choose who should make each decision: if the model is highly uncertain, humans should decide; otherwise, the AI decides. However, this approach is suboptimal, since it fails to consider the performance and fairness of humans. To account for the human factor, several authors propose learning to defer, a supervised learning method that produces both the main classifier and the assignment system, optimizing for performance and, optionally, also for fairness. Nevertheless, critical limitations, such as requiring predictions from every human for every training instance, can leave important challenges unaddressed, namely facing human capacity constraints. To this end, our goal is to build a system that eliminates these limitations and addresses the aforementioned challenges.

The state-of-the-art method to address this problem is known as learning to defer, a supervised learning method that has been developed by several authors, with the main contributions being from. Nevertheless, structural limitations can fail to address key challenges of human-AI collaboration, hindering its applicability in real-world environments. Concurrent human predictions can be needed from every human (to whom decisions may be deferred) for every training instance. Moreover, it does not consider the ubiquitous selective labels problem, where the observability of labels is conditioned by past actions. Most importantly, no solution is known where human decision capacity is limited, as it often is in reality.

ML models deployed in high-stakes applications have been found to exhibit bias against protected groups.

A vast body of research has emerged aiming to measure and mitigate unfairness. Within binary decision-making, such as bail decisions, several notions of fairness have been proposed. Demographic parity, or statistical parity, states that the probability of predicting positive (or negative) should be equal between groups. Equality of opportunity refers to parity in the true positive rate—in other words, the probability of being correctly classified as positive does not change with the group. This fairness notion, unlike demographic parity, does consider the target prevalence. Predictive equality refers to parity in the false positive rate (FPR)—the probability of being incorrectly classified as positive does not change with the group.

For every fairness notion, a parity ratio can be computed to quantify the degree of compliance. For instance, considering an underprivileged group Z=1, with higher FPR:

$$PredictiveEquality = FPRParity = \frac{P(\hat{Y}=1 \mid Y=0, Z=0)}{P(\hat{Y}=1 \mid Y=0, Z=1)}. \quad (1)$$

The simplest solution to manage assignments in human-AI collaboration can be drawn from learning with a reject option, also known as rejection learning (RL). In RL, models have the additional option of rejecting to predict with the goal of optimizing performance in the non-rejected instances. In human-AI collaboration, this can be applied to choose which instances are deferred to humans.

There are two RL frameworks. A simple option is to produce uncertainty estimates for each instance, rank them by confidence, and reject to predict below a certain confidence threshold, usually defined as a function of a coverage requirement (a minimum of non-rejected instances). While there are other more complex methods, the baseline for estimating uncertainty is simply to use the estimated probability of the predicted class $\hat{P}(y=\hat{y})$ as a measure of confidence. In binary classification with lopsided error costs, it is common to use a double-threshold solution: below the first threshold, the system predicts negative; above the second threshold, the system predicts positive. In between, the decision is deferred to humans. This is often referred to as a rejection band. Contrary to uncertainty-driven mechanisms, the rejection band solution allows for controlling the AI's number of predicted positives or the false positive rate.

FIG. 1 shows a graphical representation of a rejection band on an example predicted probability score distribution. In the rejection band, highlighted in a black rectangle, the model rejects to predict; to its left, the model predicts negative; to its right, the model predicts positive.

A different RL methodology can be provided, incorporating the reject option into the learning algorithm through a custom loss function (Equation 2). For example, the classifier can reject to predict ($s_i$=1), incurring instead in a constant, label-independent cost $\gamma_{reject}$. The regular loss $\mathcal{L}$ is downweighted by a factor of $1-s_i$, thus not penalizing the classifier for rejected predictions.

$$\mathcal{L}_R(Y,\hat{Y},s)=\Sigma_i[(1-s_i)\mathcal{L}(Y_i,\hat{Y}_i)+s_i\gamma_{reject}] \quad (2).$$

Moreover, use of RL in human-AI collaboration can be suboptimal for failing to consider the performance of a downstream human decision-maker. To this end, learning can be deferred (L2D), an extension of the RL framework, where the loss function entails an additional term aimed at modelling the performance of the human decision-maker.

In L2D, the system loss (Equation 3) depends on the choice to defer ($s_i$=1) or not to defer ($s_i$=0) to the human decision-maker H. If the human decision-maker is chosen, the system loss is the cross-entropy loss between ground-truth label Y and human prediction $\widehat{Y_H}$, plus a constant penalty term $\gamma_{defer}$ to disincentivize deferral, since human labour is costly. Conversely, if the decision is not deferred, the system loss corresponds to the cross-entropy loss of model M's prediction $\widehat{Y_M}$.

$$\mathcal{L}_{L2D}(Y,\widehat{Y_M},\widehat{Y_H},s)=\Sigma_i[(1-s_i)\mathcal{L}_{CE}(Y_i,\widehat{Y_{M,i}})+s_i\mathcal{L}_{CE}(Y_i,\widehat{Y_{H,i}})+s_i\gamma_{defer}]. \quad (3)$$

The authors propose to train a mixture of experts on this loss, with the set of experts consisting of the main classifier and the (black-box) human decision-maker. A gating neural network functions as the assignment system, determining the desired weight of each expert in the final decision by minimizing the system loss (Equation 3) with respect to its output s. In order to optimize the performance of the combined system, the main classifier is also trained on the same system loss. Both networks backpropagate in turns, constantly adapting to the behavior of the other network.

Moreover, a fairness-aware version of L2D can be introduced, through a regularized loss with an additional penalty term for error-rate disparities between protected groups.

Other measures can be supported for expanding and improving L2D. For example, a loss may not converge to a Bayes optimal solution. Accordingly, a learning scheme consisting of a single classifier can be used, with an additional class for deferral, trained on a consistent surrogate loss.

Moreover, the surrogate loss, although consistent, may be not calibrated with respect to human accuracy. Accordingly, learning one-vs-all classifiers, using an adaptation of a surrogate loss, can be used. The aforementioned contribute to whether a machine or a human is to decide.

In practice, decisions are often deferred not to a single human decision-maker, but to one or more out of a team. The whole team can be cast as a single human for the system, but this may lead to suboptimal solutions, especially if there are different types and degrees of expertise within them, as is often the case. With this in mind, L2D can be expanded to model multiple human decision-makers. The authors accomplish this through the mixture-of-experts framework, where the final prediction is the weighted sum of individual predictions from each decision-maker (human and AI). Then, the optimal weights are learned through backpropagation on a regular loss. At test time, if the goal is simply to find the best decision-maker or set of decision-makers, that can be done by ranking the output weights.

The expansion of L2D to a multi-expert setting can entail two relevant drawbacks. First, by returning to a mixture-of-experts framework, they lose the guarantee of loss consistency. Further, the assignment problem can be framed for optimizing the ideal combination of predictions; this objective is misaligned with the true target—finding the best decision-maker for each instance. The second drawback is of practical nature: by expanding L2D to a multi-expert setting, their method requires human predictions from every considered human for every training instance. This will often be unfeasible to obtain, as we discuss in the next section.

Although L2D is the assignment framework for human-AI collaboration currently garnering more attention from researchers, it nevertheless entails several limitations, and leaves important unaddressed challenges.

L2D requires predictions from every considered human for every training instance.

In real-world applications, this will often be unfeasible: teams will be staffed for regular operations, which may only involve covering a small subset of instances, with only one human being assigned to each decision. One significant drawback of this limitation is that it implies that L2D cannot update itself with new data in dynamic environments, as complete data will not be available in regular operations.

All L2D contributions propose jointly training the main classifier and the deferral system. The advantage, authors argue, is that the main classifier is allowed to specialize on the instances that will be assigned to it, in detriment of those that will not be (Equation 3). Nevertheless, this entails two major unacknowledged drawbacks. By design, specialization renders the main classifier useless in the instances likely to be deferred, as gradients are stopped from backpropagating into it. This makes L2D unsuitable for domains where the AI advises the human decision-makers, as the ML model will not be performant in the instances being deferred. Furthermore, specialization makes the system brittle: by trading off generalization for specialization, the AI is not robust to post-deployment changes on human capacity for review. If any subset of humans is unavailable, AI may not be capable of covering for them, as it was not trained on those neighborhoods, inevitably harming performance.

One or more computing devices can expand L2D to allow for modelling the expertise of teams of humans at an individual level. Unfortunately, a fundamental challenge of managing such teams includes limitations of humans by individual work capacity.

Another limitation of L2D includes the inability to deal with selective labels. Such selective labels problem can occur when decisions affect the observability of the true outcome. This can be a pervasive issue in many decision-making processes where human-AI collaboration may be used (e.g. bail decisions in criminal justice; loan approvals in finance). L2D cannot deal with selective labels, as it requires the presence of the ground-truth for each training instance.

Furthermore, supervised learning can be leveraged to model the probability of error of humans, which they model as a single entity, conditional to the input, $\widehat{P_H}$. The probability of error of the main classifier $\widehat{P_M}$ is also estimated by an auxiliary model. Then, instances are sorted according to the difference $\widehat{P_H}-\widehat{P_M}$, and the top ranked ones are deferred to humans (the exact threshold depends on human capacity). This method circumvents one of the critical limitations of L2D: it does not require human predictions for every instance (although they should still cover all of the input space to allow for valid inference). Its biggest drawback, however, is that it does not model human experts individually. Experts may exhibit differing levels and type of expertise—failing to consider that is suboptimal. Furthermore, this method does not offer a way of mitigating algorithmic unfairness, which is a principal concern in many domains.

Even datasets with one prediction per human may not be enough to test assignment systems, even if they are enough to train them. To evaluate an assignment system, its output is used to query the chosen decision-makers for their decisions. As such, only datasets with predictions from every decision-maker for every instance are adequate as offline test sets.

Moreover, to a ML classifier can to mimic expert classification on two binary classification datasets. This classifier can include the binary classifier used for the main task, but trained with an extra feature in order to simulate access to exclusive information. To introduce noise, a subset of decisions can be randomly flip. To introduce bias, with the goal of studying unfairness mitigation, the classifier can be trained with reverse fairness incentives. Moreover, a model-as-expert technique can be used to produce an expert on a dataset to train a classifier with access to the image meta-data. One drawback of the model-as-expert technique is the extent of the agreement between the synthetic expert and the main classifier trained to predict the target. Since the synthetic expert is also a ML algorithm, trained on largely the same data, it will tend to agree more with the main classifier than a real human presumably would.

Other known systems produce arbitrarily accurate expert decisions based on varying sets of rules. For example, an expert can be simulated with perfect accuracy on a number (e.g., 5 out of 10) of classes, with random accuracy on the remainder Additionally, another drawback of arbitrarily accurate synthetic experts is that their expertise is either feature independent or only dependent on a single feature or concept. As such, the methods tested on these benchmarks are not being challenged to learn nuanced and varied types of expertise—a reality of most real-world ensembles of human experts.

These facts are disclosed in order to illustrate the technical problem addressed by the present disclosure.

BRIEF SUMMARY OF THE PRESENT DISCLOSURE

In one or more implementations of the present disclosure, a computer-implemented machine-learning training method and system are provided that include receiving, by one or more computing devices, one or more training instances and inputting the received one or more training instances, by the one or more computing to a first machine-learning model. The one or more computing devices receive from the first machine-learning model, for each of the one or more training instances, one or more respective classification prediction outputs and one or more respective error prediction outputs. The one or more respective error prediction outputs include an output representing one or more of a false-negative, a false-positive, a true-negative, and a true-positive. Moreover, the one or more computing devices input to a second machine-learning model, the received one or more training instances, the one or more respective classification prediction outputs, and one or more identifiers of one or more constraint-limited classifiers. The one or more computing devices receive, from the second machine-learning model for each of the one or more training instances and each of the one or more constraint-limited classifiers, a predicted error output that includes one or more of a predicting false-negative, a false-positive, a true-negative, and a true-positive. The one or more computing devices obtain a composite loss-function from a loss function for a constraint-unlimited machine-learning classifier using the one or more respective error prediction outputs for the received one or more training instances from the first machine-learning model and a loss function for each of the one or more constraint-limited classifiers using the predicted error for the received one or more training instances from the second machine-learning model. The one or more computing devices assigned the received one or more training instances to the constraint-unlimited machine-learning classifier or the one or more constraint-limited classifiers, thereby minimizing the composite loss function.

In one or more implementations of the present disclosure, the loss function for each of the one or more constraint-limited classifiers includes one or more function terms for constraints of the constraint-limited classifiers.

In one or more implementations of the present disclosure, the one or more constraint-limited classifiers are capacity-constrained and the constraint-unlimited machine-learning classifier is capacity-unconstrained, and further wherein a capacity-constraint is a maximum value of classified instances per time period, including a minute, hour, day, week, month and/or year.

In one or more implementations of the present disclosure, the second machine-learning model includes a plurality of sub-models, each of the plurality of sub-models for each of the one or more constraint-limited classifiers. Inputting the one or more identifiers of the one or more constraint-limited classifiers to the second machine-learning model comprises selecting, by the one or more computing devices, a respective sub-model, wherein the selected sub-model is selected for inputting the received one or more training instances, and the predicted classification for the received one or more training instances by the first machine-learning model, and the selected sub-model is selected for outputting a predicted error for the received one or more training instances for each of the one or more constraint-limited classifiers.

In one or more implementations of the present disclosure, the one or more training instances is a single training instance.

In one or more implementations of the present disclosure, each of the constraint-limited classifiers is an aggregation of individual constraint-limited classifiers.

In one or more implementations of the present disclosure, the one or more computing devices initialize three deployment stages of training the first machine-learning model using classifications provided by one or more constraint-limited classifiers or ground-truth classifications. The one or more computing devices further train the second machine-learning model using classification errors of classifications provided by one or more constraint-limited classifiers when supplied with classifications provided by the trained first machine-learning model.

In one or more implementations of the present disclosure, the first machine-learning model is pretrained to output a predicted classification. The one or more computing devices compare, for each of one or more training instances and for each of the one or more constraint-limited classifiers, the error prediction outputs from the second machine-learning model against a ground-truth classification error made by the one or more constraint-limited classifiers.

In one or more implementations of the present disclosure, the target machine-learning model is the first machine-learning model.

In one or more implementations of the present disclosure, the error is a classification error associated with a machine-learning model performance error combined with a machine-learning model disparate predictive error across sub-groups of a population, in particular unbalanced sub-groups of a population.

In one or more implementations of the present disclosure, the loss function is a linear sum of the probability of a true positive (TP), true negative (TN), false positive (FP), false negative (FN), each with an associated weight, preferably the linear sum being obtained using a confusion matrix of costs.

In one or more implementations of the present disclosure, the loss function is defined as $\mathcal{L}=\lambda\hat{P}(FP)+\hat{P}(FN)+\alpha Z\hat{P}(FP)$, wherein $\alpha$ is a pre-defined constant associated with a fairness metric, and $Z\epsilon-1,1$.

Accordingly, the present disclosure addresses a lack of robust and nuanced benchmarks for the evaluation of assignment systems in human-AI collaboration by a method to simulate human decisions, and use it to create a testbed simulating a real-world fraud detection task with capacity constraints.

BRIEF DESCRIPTION OF THE DRAWINGS

The following figures provide preferred implementations for illustrating the disclosure and are not to limit the scope of the present disclosure.

FIG. 5 illustrates a schematic representation of testbed data splits, in accordance with an example implementation of the present disclosure.

DETAILED DESCRIPTION

Figure 1:
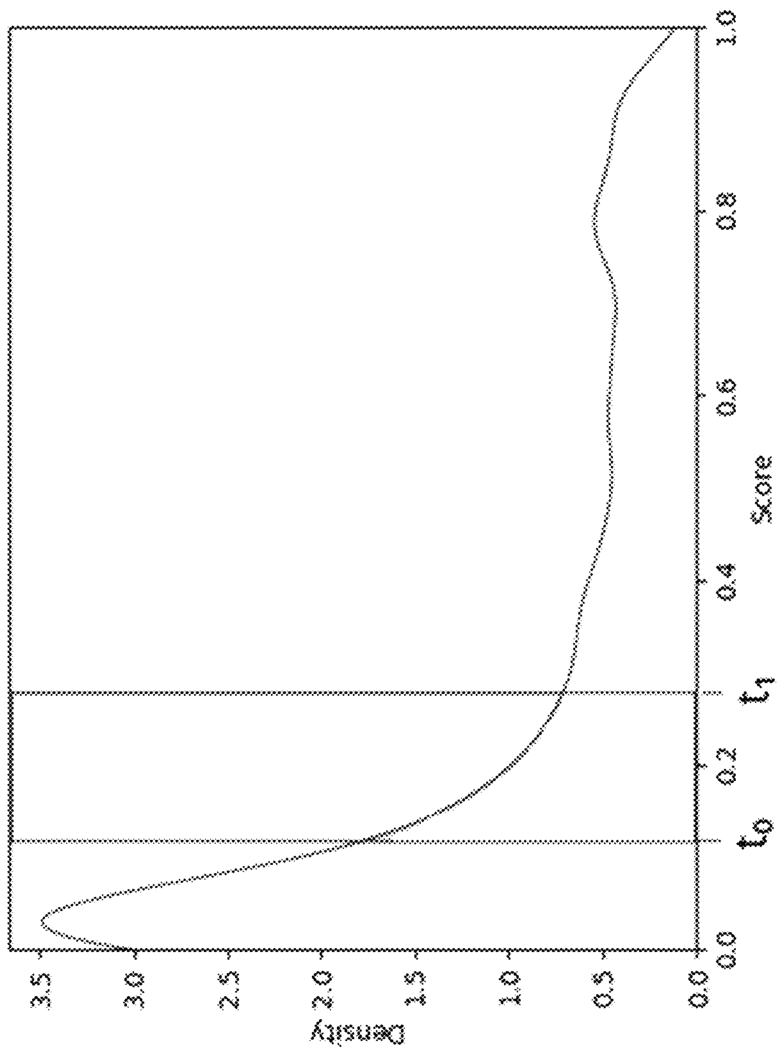
FIG. 1 is a graphical representation of a rejection band on an example predicted probability score distribution.

The present disclosure provides a computer-implemented machine-learning training method and system that include receiving one or more training instances and inputting the received one or more training instances to a first machine-learning model. For each of the one or more training instances, one or more respective classification prediction outputs and one or more respective error prediction outputs can be received and the one or more respective error prediction outputs can include an output representing one or more of a false-negative, a false-positive, a true-negative, and a true-positive. Moreover, the received one or more training instances, the one or more respective classification prediction outputs, and one or more identifiers of one or more constraint-limited classifiers can be input to a second machine-learning model. For each of the one or more training instances and each of the one or more constraint-limited classifiers, a predicted error output that includes one or more of a predicting false-negative, a false-positive, a true-negative, and a true-positive can be received from the second machine-learning model.

Briefly, as will be appreciated, systems and methods consistent with this disclosure can be performed by software or firmware in machine readable form on a tangible (e.g., non-transitory) storage medium. For example, the software or firmware can be in the form of a computer program including computer program code adapted to cause the system to perform the monitoring and various actions described herein when the program is run on a computer or suitable hardware device, and where the computer program can be embodied on a computer readable medium. Examples of tangible storage media include computer storage devices having computer-readable media such as disks, thumb drives, flash memory, and the like, and do not include propagated signals. Propagated signals can be present in a tangible storage media. The software can be suitable for execution on a parallel processor or a serial processor such that various actions described herein can be carried out in any suitable order, or simultaneously. The code utilized by one or more implementations of the present invention comprise instructions that control the processor to execute methods, such as detailed herein. The instructions can comprise a program, a component, a single module, or a plurality of modules that operate in cooperation with one another. More generally, the code comprises a portion of an implementation implemented as software. The component(s) or module(s) that comprise a software implementation can include anything that can be executed by a computer such as, for example, compiled code, binary machine level instructions, assembly code, source level code, scripts, function calls, library routines, and the like. In other implementations, the code can be implemented in firmware or a hardware arrangement.

An outcome of the present disclose provides an assignment system for human-AI collaborative decision-making. This assignment system determines who decides in each instance, choosing between the ML model and any available human.

Accordingly, in one or more implementations of the present disclosure, a method named learning to assign (L2A), a fairness- and capacity-aware human-AI collaboration system. A model can be provided of the humans' probability of error conditional to the feature space, including the protected attribute, as well as the main classifier's output. Second, it is estimated the main classifier's probability of error. With the predicted probability of error, it is calculated a cost-sensitive loss function, which accounts for performance and fairness.

Assignments are performed by minimizing the loss function across a set of deployment instances, while respecting any existing capacity constraints.

In deployment, capacity constraints can be defined at a batch level (e.g. each human can only review n decisions per day).

In this case, the assignment algorithm runs individually for each batch, such that it satisfies said constraints.

Figure 2:
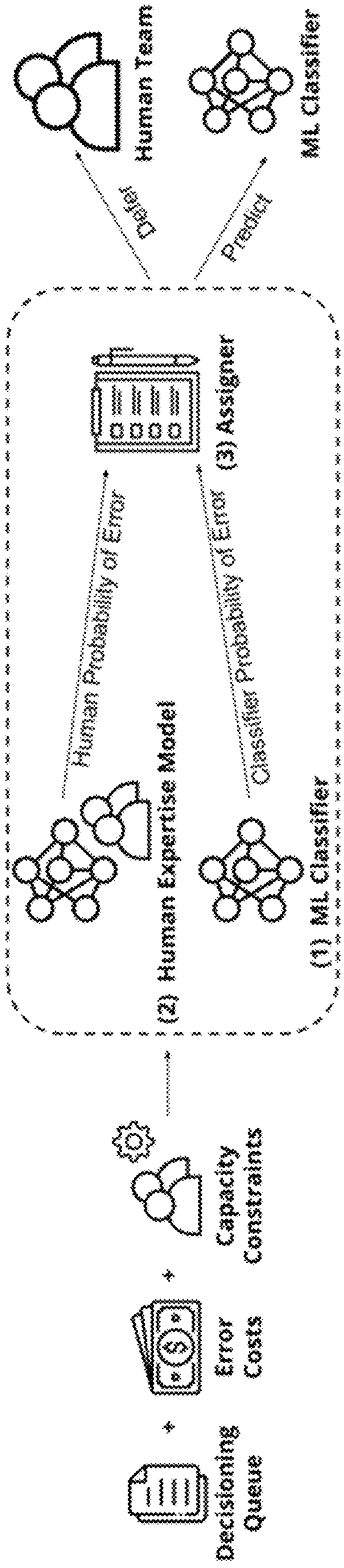
FIG. 2 illustrates a schematic representation of components of learning to assign, in accordance with an example implementation of the present disclosure.

FIG. 2 shows a schematic representation of the components of learning to assign. Learning to assign (L2A): a fairness- and capacity-aware human-AI collaboration system.

The segmented architecture of L2A estimates performance without requiring predictions from every human for every instance, and without having to change the training process of the main classifier. Furthermore, since one or more computing devices provide probabilities of error, any custom loss function can be minimized, while respecting an arbitrary set of capacity constraints. These capacity constraints can even change throughout time.

Equation 4 discloses an embodiment of L2A. It is considered the vector of instances x, of length n, and the vector of decision-makers d, of length m (includes both the main classifier and the human decision-makers). L2A starts by building a loss matrix L where entry $L_{ij}$ corresponds to the predicted loss of attributing instance i to decision-maker j. The predicted loss is calculated through a function $\mathcal{L}(x_i, d_j)$, which depends on the optimization objective. For instance, if the goal is to maximize accuracy, $\mathcal{L}(x_i, d_j)=P(\hat{y}\neq y|x_i,d_j)$ is an adequate loss function.

The matrix of assignments $A_{n\times m}$ has the same dimensions; each entry $A_{i,j}\in 0,1$, depending on whether instance i was assigned to decision-maker j or not. In L2A, the matrix of assignments A is defined such that it minimizes the total loss function $\mathcal{L}$, subject to a vector of capacity constraints c of length m:

$$A_{L2A} = \operatorname{argmin}_{A\in\{0,1\}^{n\times m}} \sum_i \sum_j L_{ij} A_{ij}, \tag{4}$$

$$\sum_i A_{ij} = c_j, \text{ for } j \in \{1, 2, \ldots , m\},$$

$$\sum_j A_{ij} = 1, \text{ for } i \in \{1, 2, \ldots , n\}.$$

In an embodiment, the first constraint refers to human decision capacity. The number of instances assigned to each decision-maker is predefined in the problem statement. This constraint may be changed to an inequality expressing the maximum number of assignments per decision-maker. The second constraint states that each instance can only be assigned to one human decision-maker.

In an embodiment, more than one human decision-maker classify on the same instance. For example, a committee of experts classify a medical-related instance.

In an embodiment, the final decision being extract as an aggregation of the individual decisions, among other possibilities, e.g., several human decision-makers give their input but the decision is ultimately done by a single human decision-maker.

With limited human capacity for work, allocating more than one human decision-maker to a specific instance can only be optimal in scenarios where the cost of error is disproportionately high.

L2A uses two separate methods to estimate the probability of error: one for human decision-makers, the other for the ML model (henceforth referred to as the main classifier).

For human decision-makers, the aim is to estimate the conditional probability of error, given features, the human, and the main classifier's output.

In an embodiment, supervised learning is used to train a human expertise model, casting the aforementioned conditionals as the augmented feature space. To this end, each instance of the training and validation sets corresponds to a human prediction, and should also include the main classifier's features, its output, and an identification of the human behind the prediction.

The target of the human expertise model depends on the downstream optimization goal. If the goal is to maximize accuracy, the target can be a 0-1 loss, indicating whether a specific prediction is correct or not. If the goal depends on specific error types—for example, recall at a given false positive rate (FPR) level—then the target should encompass all possible outcomes, namely true positive, true negative, false positive, and false negative; the human expertise model is then a multiclass classifier.

The best algorithm and set of hyperparameters was found by minimizing the cross-entropy loss in a validation set. The optimization goal should not be a ranking metric, such as the AUC or recall, since the goal is to obtain good probabilities.

In an embodiment, regardless of the target, the human expertise model is a single classifier, responsible for making predictions for every human, or an ensemble of classifiers, one for each human decision maker. For the former, the training set must include an ID for the human decision maker behind each prediction encoded as a categorical feature. At scoring time, this feature can be imputed with every possible decision-maker to obtain the corresponding predicted probability of error.

In an embodiment, the human decision maker ID does not need to be encoded as a feature, but the training set must be divided according to it. Then, the classifiers representing each decision-maker are trained on the corresponding subset, and are all queried at scoring time to obtain the predicted probabilities of error. Both are valid approaches, and should be tested and ranked according to operational constraints—the single classifier is easier to upkeep—and performance.

If there is a common pattern among different decision-makers the single classifier is better than the separate classifiers, as these would be disadvantaged from not having access to the data corresponding to other human decision-makers.

Figure 3:
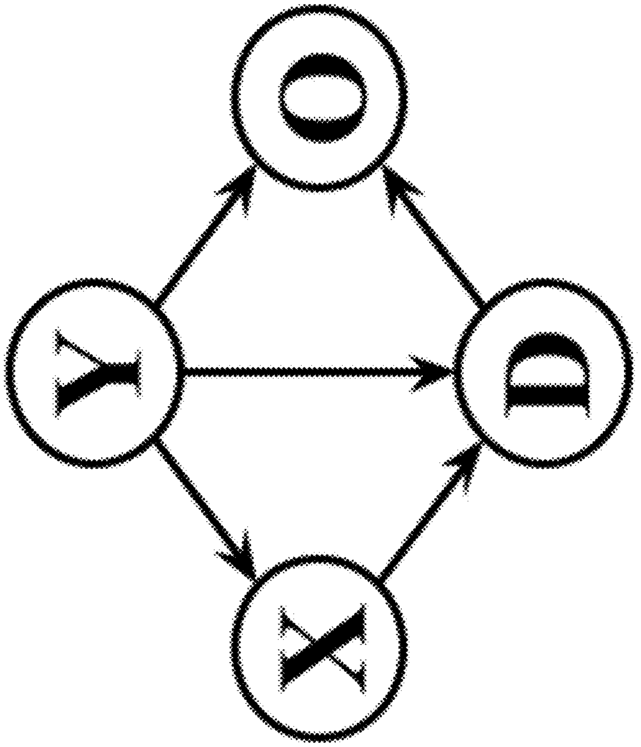
FIG. 3 is a schematic representation of a causal graph.

In an embodiment, instead of directly modelling the probability of error, the model the human decision and the ground-truth separately. The decision model is similar to the error model described above, except that the target is not the error, but the decision itself. The ground-truth model is similar to the main task classifier: the goal is to predict the label itself. The decision and the ground-truth are indeed the only two causal factors influencing the final outcome (FIG. 3). For instance, the probability of a decision being in a true positive is simply the probability that the label is positive times the probability that the human will predict it to be positive.

FIG. 3 shows a schematic representation of a causal graph describing how the outcome O results directly from label Y and decision D. Y causes observable features X, and causes D through features only humans can observe.

Nevertheless, since one of the objectives is to obtain the probabilities of different outcomes, it does not make sense to segment the modelling process into a decision model and ground-truth model. Performance can be harmed due to the fact that the hyperparameters of both models would have to be optimized separately, and not towards the final goal.

In deployment, if new decision makers are included in the decision-maker ensemble, state-of-art models may not perform well for not previously observing the decision patterns.

In an embodiment, the error probabilities of a new human in the training set are combined with the mean probabilities of other humans, while there are not enough instances to include the new human in the training set.

In an embodiment, the decision and the ground-truth labels are both unknown for a humans classifier's probability of error.

In an embodiment, the ground-truth is unknown for a main classifier, at scoring time, its decision is known: it only depends on its output and on the threshold. However, as mentioned above, a model predicting the ground-truth is equivalent to the main classifier.

In an embodiment, the main classifier's output to gauge its probability of error is defined as:

$$\begin{cases} \hat{P}(y=0 \mid \hat{y}=1) = 1 - \widehat{P_{MC}}(y=1), \\ \hat{P}(y=1 \mid \hat{y}=0) = \widehat{P_{MC}}(y=1). \end{cases} \tag{5}$$

Nevertheless, ML algorithms can suffer from calibration issues, such as overconfidence. This would harm the effectiveness of this method, since it relies on comparing the probability of error of the main classifier—which is obtained from its output—with the probability of error of humans. To this end, testing using isotonic regression to calibrate the outputs of the main classifier before using them to predict the probability of error can be provided.

Isotonic regression aims to find a nondecreasing function m: $\mathbb{R} \rightarrow \mathbb{R}$ that minimizes the squared error between transformed predictions $m(\hat{y}_i)$ and the ground-truth label y (Equation 6). Unfortunately, this technique can tend to overfit when applied to a small volume of data. Thus, isotonic regression can be applied over the whole training set of the assignment system.

$$m = argmin_{z:\ y \leq y' \Rightarrow z(y) \leq z(y')} \Sigma_i (y_i - z(\hat{y}_l))^2. \tag{6}$$

In an embodiment, before applying calibration, some of the uncertainty estimation techniques can also be applied This methodology predicts the conditional probabilities of each relevant outcome, given any instance and decision-maker.

In an embodiment, the conditional probabilities of each relevant outcome are combined in a loss function that optimizes the system goal.

This method optimizes assignments by modelling the probability of error of the considered decision-makers, and combining it into a loss function to be minimized across a set of instances. This loss function can take many forms, depending on the final optimization goal. If the goal is to maximize accuracy, then the probability of error $\hat{P}(\hat{y} \neq y)$ already constitutes a valid loss function. If the optimization objective depends on specific error types, a cost-sensitive approach is more adequate.

Figure 4:
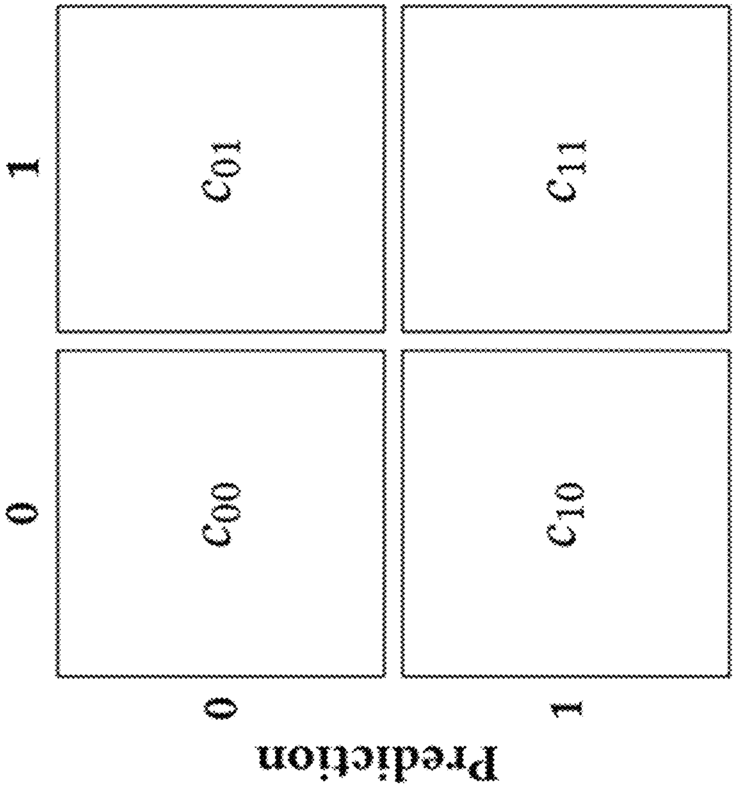
FIG. 4 illustrates an example costs confusion matrix.

In an embodiment, a confusion matrix of costs (FIG. 4) associated with each outcome is first provided. The specific values depend on the domain and application. For instance, in medicine, false positives (false alarms) are usually less costly than false negatives (diseases that will go untreated). FIG. 4 shows a costs confusion matrix.

This cost-sensitive loss function corresponds to the weighted sum of the predicted probability of outcomes with their cost (Equation 7).

$$\mathcal{L} = c_{00}\hat{P}(TP) + c_{01}\hat{P}(FP) + c_{10}\hat{P}(FN) + c_{11}\hat{P}(TN). \tag{7}$$

A confusion matrix of costs only has one degree of freedom (Equation 8).

$$c_{00}TP + c_{01}FP + c_{10}FN + c_{11}TN == \tag{8}$$

-continued $$c_{00}(LP - FN) + c_{01}FP + c_{10}FN + c_{11}(LN - FP) =$$
$$(c_{10} - c_{00})FN + (c_{01} - c_{11})FP + c_{00}LP + c_{11}LN,$$

where LP denotes the total number of label positives and LN denotes the total number of label negatives. Since LP and LN are constants, their terms can be removed from the loss without changing resulting rankings. Finally, by dividing everything by $c_{10} - c_{00}$, an expression of the form λFP+FN can be reached, without changing resulting rankings.

Preferably the following loss, as a simplification of the previous loss, is used:

$$\mathcal{L} = \lambda\hat{P}(FP) + \hat{P}(FN), \text{ with } \lambda = \frac{c_{01} - c_{11}}{c_{10} - c_{00}}. \tag{9}$$

One drawback of defining the problem through the lens of cost-sensitive learning is that a matrix of costs may not be available.

Alternatively, the optimization goal is expressed by a Neyman-Pearson criterion, such as to maximize recall subject to a fixed FPR, preferably testing several values of λ on the validation set of the human expertise model. To evaluate each value of λ, the human expertise model can be used to calculate the corresponding predicted FPR, thus not requiring extra predictions from humans. Then, the value of λ with the predicted FPR closest to, but below the desired level is chosen.

It is known that for any cost structure, there is a theoretical threshold for binary classifiers that minimizes the cost:

$$t = \frac{c_{10} - c_{00}}{c_{10} - c_{00} + c_{01} - c_{11}}. \tag{10}$$

In an embodiment, $c_{00}$ and $c_{11}$ are set to zero as above, then $$\lambda = \frac{c_{01}}{c_{10}},$$

and the value of λ that is equivalent to the main classifier's threshold can be obtained:

$$t = \frac{c_{10}}{c_{10} + c_{01}} \Leftrightarrow \frac{t}{1-t} = \frac{c_{10}}{c_{01}} \Leftrightarrow \lambda = \frac{t}{1-t}. \tag{11}$$

This method can have some limitations, first the theoretical threshold does not work well in practice; testing several values in validation may work better. Second, the cost structure equivalent to a Neyman-Pearson criterion changes between classifiers, depending on their precision. As such, the theoretical value of λ would likely not lead to a solution respecting that criterion.

Nevertheless, it may be useful to use this technique when the goal is simply to optimize other architecture choices, as optimizing λ for a Neyman-Pearson criterion is often time-consuming. As discussed previously, algorithmic decision-making systems are capable of bias against protected societal groups.

In an embodiment, model fairness is optimized through a loss-based approach: the loss is added to a regularization term, that depends on the protected group. The nature of this term depends on the chosen fairness metric. An example of fairness metric is a predictive equality.

As introduced previously, predictive equality (FPR parity) is a fairness notion that is satisfied when the false positive rate is equal for all groups (Equation 1).

In an embodiment, the FPR parity is measured as the ratio between the minimum FPR and the maximum FPR.

In an embodiment, to reduce FPR disparity, a loss a term of the form $\alpha z\hat{P}(FP)$ is added to the loss function of Equation 9, where $\alpha$ is a constant, and Z $\varepsilon$−1, 1, depending on the protected group: Z=1 for the underprivileged group and Z=−1 for every other group:

$$\mathcal{L}=\lambda\hat{P}(FP)+\hat{P}(FN)+\alpha Z\hat{P}(FP),\ \text{with}\ Z\in 1,1. \tag{12}$$

The underprivileged group is determined a priori, by observing the FPRs in the validation set. With $\alpha=0$, the system will not optimize for fairness. As a increases, the cost of incurring in a false positive for an instance of the protected group increases, thus disincentivizing assignments that would probably result in that. This, in turn, reduces the FPR disparity, as desired. As with most fairness interventions, increasing its power—here by increasing $\alpha$—is expected to deteriorate performance, as measured by Equation 9.

In an embodiment, the value of a is configurable for a fairness-performance trade-off.

In order to optimize for other fairness metrics, one need only change the outcome of interest. For demographic parity—equality of predicted positive rates between groups—the predicted probability of predicting positive P(PP) should be used; for equality of opportunity—parity between true positive rates—the predicted probability of the outcome being a true positive $\hat{P}$(TP) should be used.

As exemplified in Equation 4, L2A optimizes assignments by modelling the probability of error of the considered decision-makers and minimizing a custom loss function. The assignment algorithm receives a matrix of costs L of dimensions n×m, where n is the number of instances and m is the number of decision-makers. An entry $L_{ij}$ corresponds to the cost of assigning instance i to decision-maker j. These values are obtained by querying the probability of error model and calculating the loss as a function of its output. Given L, the assignment system aims to find the assignment matrix of similar dimensions A that minimizes the element-wise product of the two, subject to the capacity constraints expressed by vector c of length m.

In an embodiment, assignments are also constrained to one decision-maker per instance, as justified at the beginning of this chapter. If, in deployment, instances are separated in batches, with capacity constraints defined for each batch, the assignment algorithm runs on each batch individually.

In an embodiment, integer linear programming is used, in particular to solve the assignment problem (Equation 4).

In an embodiment, as a baseline, a greedy sequential algorithm is used: for each row of the matrix, choose the decision-maker achieving minimum loss; if that decision-maker has exceeded its capacity, choose the next decision-maker, and so on. In certain situations, this greedy algorithm may be suboptimal: when choosing the best decision-maker for each instance, it does not consider that they may have greater impact on future decisions, for which they might not be available if they are chosen now.

The proposed L2A method provides an assignment system for human-AI collaboration that optimizes fairness under human capacity constraints, without requiring concurrent human predictions for every instance.

It is also disclosed a testing method of evaluation benchmark centered on a novel technique to generate complex, feature-dependent experts. Thus, synthesizing expert classification on top of available datasets.

To mimic the diversity found in teams of real humans, the decisions of synthetic experts should depend, to a certain extent, on the features. Some should have a larger random component, being harder to predict, while others should tend to agree more with the main classifier. Some should be more unfair. To allow for this adaptability and flexibility, it is herein disclosed a testing model named Linearly-Accurate Synthetic Experts.

In an embodiment, for any given instance, the probability of error is defined as a linear function of features X plus a random component $\varepsilon$:

$$P(\hat{y}\neq y)=\text{clip}(\beta_0+\beta_1X_1+\beta_2X_2+\ldots+\beta_mX_m+\varepsilon), \tag{13}$$

where clip(u)=max(min(u, 1), 0).

In an embodiment, to obtain a decision, this probability is used to randomly sample a Boolean variable. If the outcome is False, the synthetic expert will predict the correct label; otherwise, it will predict incorrectly. Preferably, a logical expression is not used in order to allow for a linear interpretation of coefficients, which are important to set desired properties.

In an embodiment, the linear expression of Equation 13 is clipped to the [0, 1] interval. Unless the $\beta_0$ is extremely low or extremely high, clipping should rarely occur, or not at all. Thus, it does not significantly affect said desired properties.

In a particular embodiment, the feature space is transformed as follows: Features in X are transformed to percentile values, centered around zero, and scaled to the [−0.5, 0.5] interval. This ensures that the features' impact on accuracy is not dependent on their scale; furthermore, under the assumption that features in X are linearly independent, the expected probability of error is equivalent to $\beta_0$—a convenient feature, in practice. Since binary features cannot be transformed into percentiles, they are instead transformed to have zero-mean and the same amplitude as the transformed continuous features. Categorical features follow the same transformation, after being target encoded (In target encoding, categories are encoded into the non-negative integers series following an ascending order of target prevalence). As such, the interpretation of the $\beta$ coefficients is as follows: for continuous features, increasing X from its minimum value to its maximum value increases the probability of error by $\beta$, all else being equal, and assuming that clipping does not occur. For binary features, changing X from 0 to 1 increases the probability of error by $\beta$, all else being equal, and assuming that clipping does not occur. For categorical features, changing X from one category to the next with more target prevalence, out of c categories, increases the probability of error by $\beta$/c.

To instantiate an ensemble of synthetic experts, both the $\beta_i$ coefficients and $\sigma_\varepsilon$ must be defined. These values affect the synthetic experts' properties: higher $\beta_0$ values result in less accuracy; higher $\beta_{1,\ldots,d}$ coefficients, in absolute value, imply more feature dependence; increasing $\sigma_\varepsilon$ increases the variance of the probability of error.

In binary classification, one may want to control properties such as recall or false positive rate (FPR). This is due to the fact that the cost of errors is not symmetric and classes are often severely unbalanced (e.g. cancer detection). In this context, it is proposed to unravel the error probability function into two probability functions conditional on each class:

$$\begin{cases} P(\hat{y}=0 \mid y=1) = \text{clip }(\alpha_0+\alpha_1X_1+\alpha_2X_2+\ldots+\alpha_mX_m+\varepsilon_1) \\ P(\hat{y}=1 \mid y=0) = \text{clip }(\beta_0+\beta_1X_1+\beta_2X_2+\ldots+\beta_mX_m+\varepsilon_2) \end{cases}. \tag{14}$$

The interpretation of all coefficients remains similar, with the difference that they now refer to a specific error type, conditional on a specific class label. As such, the intercepts now allow control over key binary classification metrics. Assuming features are conditionally independent, given the positive class, $\alpha_0$ corresponds to the false negative rate (FNR), which equals one minus the true positive rate (TPR), also known as recall. Assuming features are conditionally independent, given the negative class, $\beta_0$ corresponds to the FPR.

In an embodiment, in order to ensure the desired properties, intercepts are adjusted by observing empirical deviations resulting from the violation of the conditional independence assumption.

A dataset for evaluating assignment systems for human-AI collaboration is very hard to obtain, as the evaluation of assignment systems requires the test set to contain predictions from every decision-maker for every instance. One possible solution is using synthetic experts.

One of the goals of this method is for human-AI collaboration in real-world decision-making processes, which entail a time dynamic and a relevant fairness component. The bank-account-fraud tabular dataset was used for testing the method. It is a synthetic replica of a real fraud-detection dataset, generated using a CTGAN. The original dataset served the purpose of training a binary classifier to detect fraud in bank account applications. This task entails a relevant fairness concern: ML models tend to raise more false fraud alerts for older clients (≥50) thus reducing their access to a bank account. This corresponds to an FPR disparity. The dataset contains a total of one million rows, spread out across eight months. The number of instances per month varies, with the average being 125,000, the minimum 96,843 and the maximum 150,936. The fraud prevalence throughout the whole dataset is 1.11%—fraud detection is, as one would expect, an example of an highly unbalanced problem. The dataset contains 30 features with predictive power over the target—19 numeric, 6 binary, and 5 categorical. The optimization goal in this task is to maximize recall at 5% FPR.

To simulate a real-world deployment of a Human-AI team, it was assumed a chronological timeline. The main classifier was trained on the first three months and validated on the fourth. This split is chronological, as opposed to randomized or stratified, since, due to concept drift, the latest data is expected to most faithfully represent future data.

To train the main classifier, LightGBM and Random Forests were both tested. Deep learning techniques were not tested due to their subpar performance in classification tasks involving heterogeneous tabular data, a finding that has been corroborated. LightGBM is chosen in detriment of XGBoost since, in large datasets, such as this one, it offers similar performance with much lower computation time. The choice of algorithm and hyperparameters is optimized to minimize cross-entropy, since the goal is not to rank, but to obtain good probability estimates. The hyperparameter optimization target is recall at 5% FPR. At that FPR level, the best obtained recall on the validation set is 53.38%. The FPR for customers older than 50 is 8.85%, whereas that for younger customers is 3.98%, making for a 4.88% FPR disparity.

To simulate synthetic experts, no expert decisions are produced in the first three m-nths—the time period where the main classifier is trained.

For example, in the fraud detection domain, human decision-makers rely on the main classifier's output (also referred to as model score) to make a decision. As such, it does not make sense to have human predictions in the main classifier's training set.

In an embodiment, the synthetic experts require the data to be normalized, or pre-processed following the steps: the preprocessors are fit in the same time period where the main classifier is trained—the first three months. The testbed's ensemble of experts is composed of 50 individuals. Most, but not all, are better than the main classifier, in accordance with the common assumption around domain experts. To this end, it was sampled the ensemble's intercepts defining the false negative rate (one minus recall) and false positive rate (Equation 14) from two Gaussian distributions:

$$\begin{cases} a_0 \sim N(\mu = FNR_{classifier} - \sigma_{\alpha_0}, \sigma_{\alpha_0} = 4\%) \\ \beta_0 \sim N(\mu = FPR_{classifier} - \sigma_{\beta_0}, \sigma_{\beta_0} = 0.5\%) \end{cases}. \tag{15}$$

Other coefficients are also randomly drawn from two Gaussian distributions:

$$\begin{cases} a_{1-n} \sim N(\mu = 0, \sigma = 5\%) \\ \beta_{1-n} \sim N(\mu = 0, \sigma = 1\%) \end{cases}. \tag{16}$$

In an embodiment, a transformation is applied: all these coefficients are clipped to zero if they do not exceed the standard deviation in absolute value. This transformation makes the synthetic experts more realistic on two counts: first, it reduces the amount of relevant features of each equation to 31.73% of the feature space; second, it avoids very small dependencies. Noise terms are set to $\sigma_{\varepsilon_i}=1\%$ and $\sigma_{\varepsilon_2}=0.25\%$.

As mentioned above, for the particular case of fraud detection, human experts have access to the model score—the predicted probability of fraud—and use it to aid them in their decision. To reflect this, the set sampled the score coefficients as such:

$$\begin{cases} \alpha_{score} \sim N(\mu = -20\%, \sigma = 1\%) \\ \beta_{score} \sim N(\mu = 2\%, \sigma = 0.1\%) \end{cases}. \tag{17}$$

In an embodiment, the synthetic experts are as unfair as the main classifier, on average. To this end, the protected attribute coefficient was sampled in the FPR equation from a Gaussian with mean equal to the FPR disparity of the main classifier in the validation set:

$$\beta_{customer\_age} \sim N(\mu=4.88\%, \sigma=0.25\%). \tag{18}$$

Since, in this particular example, the FPR disparity is used as the fairness metric, the protected attribute does not influence the FNR equation.

Out of the ensemble of 50 experts, 20 of those—called the regular experts—have the aforementioned properties. The rest are separated in three equal-sized groups of 10 experts, with each group designed to deviate from the norm in a specific way. Heavily feature-dependent experts have higher standard deviation in the generation of coefficients (Equation 16): in the false negative equation, $\sigma$=7.5% (not 5%); in the false positive equation, $\sigma$=1.5% (not 1%). Heavily model-dependent experts have higher mean score coefficients in absolute value (Equation 17): in the false negative equation, $\mu$=−40\% (not −20%); in the false positive equation, $\mu$=4% (not 2%). Heavily unfair experts have a higher mean protected attribute coefficient in the false negative equation (Equation 18): $\mu$=7% (not 4.88%).

For this particular testing example, all the constants discussed above were set arbitrarily, since that there is any publicly available data that does not suffer from the selective labels problem. Nevertheless, the properties can be set based on real data.

The ensemble of experts were deployed in the time period spanning from the end of the main classifier's training set—the beginning of the fourth month—to the eight (and last) month. This complete matrix of predictions can be used to test methods that require access to predictions for all instances from all decision-makers. However, one of the goals is to test human-AI collaboration under realistic constraints, such as sparse human data and capacity constraints. To this end, training and testing variants are disclosed, designed to challenge assignment systems in different ways.

In an embodiment, the training set spans from the fourth month to the seventh month. FIG. 5 depicts the timeline, complete with where the main classifier was trained and where synthetic experts were fit.

FIG. 5 shows a schematic representation of the testbed data splits.

The evaluation benchmarks included human capacity constraints, as they are a reality in many applications of human-AI collaboration. Furthermore, realistically, these constraints apply over batches of instances, not over the whole dataset. In real-world teams, assignments must be balanced between elements on a daily basis—it is not enough to be balanced, on average, over a whole month. With this in mind, the dataset was divided into batches, and apply capacity constraints to each. As an example, two different batch sizes were used: a small batch size of 1,000, and a large batch size of 5,000. For reference, in the test set (96,843 instances), in the first variation there are 97 batches, whereas in the second there are 20. The rationale behind having two disparate batch sizes is to be able to test assignment methods on short and long horizons.

For each batch size, four capacity constraints are tested: the regular, human-scarce, disparate, and inconstant. In the regular capacity scheme, human experts can only take 50% of decisions, while the model takes the rest. Every expert has the same capacity. The human-scarce scheme differs in that human experts can only take 20% of decisions. In the disparate scheme, some experts have greater capacity for work than others; this is defined a priori by sampling from a Gaussian with standard deviation 20%. Finally, in the inconstant scheme, a random subset of 50% of experts is unavailable in each batch. Preferably, any method evaluated on our benchmark must respect these capacity constraints.

All of the aforementioned capacity constraints are equalities, not inequalities. For instance, in the regular capacity scheme, 50% of instances must be attributed to humans, not less. One can argue that it is always possible to increase automation at will, and as such human capacity constraints should only be upper limits. Nevertheless, in reality, it would be destabilizing to attribute (much) less work to a specific worker than they are expecting. As such, in an exemplary embodiment, the capacity constraints are encoded as equalities. Furthermore, being equalities, assignment systems can only assign one decision-maker per instance. Preferably, the possibility for several decision-makers to decide on the same instance is disregarded. While this may be a reasonable option at times, e.g., with difficult decisions, for this particular example it wasn't added this extra layer of complexity.

Thus, the eight proposed variants are the Cartesian product between the two possible batch sizes and the four possible capacity constraints, as summarized in Table 1.

TABLE 1

Testbed variants.

| ID | Batches | Capacity |
|---|---|---|
| S-R | Small | Regular |
| S-S | Small | Human-scarce |
| S-D | Small | Disparate |
| S-I | Small | Inconstant |
| L-R | Large | Regular |
| L-S | Large | Human-scarce |
| L-D | Large | Disparate |
| L-I | Large | Inconstant |

To each variant corresponds a unique training set and test set. The training set is produced by randomly assigning instances to decision-makers, e.g., through shuffling, while respecting the capacity constraints within each batch. Then, the assigned human decision-makers are queried for their decision. Hence, in the training set, not every instance contains a human prediction, as they may have been attributed to the AI. Moreover, there are no concurrent predictions from several humans for the same instance, as explained above.

In this exemplary test set, no human predictions are available. It consists only of the features and model scores. The same eight variants apply. To evaluate a set of assignments on the test set, the experts can be queried. Note that the test set should be seen as the deployment set, and only queried once. In reality, it is not feasible to repeatedly ask human experts for more predictions. As such, hyperparameterization should be performed within the training set, without requiring extra human predictions.

With this technique, a testbed was built based on a large public dataset for fraud detection. In it, there are eight variants with varying batch sizes and capacity constraints, which allow for thorough evaluation of assignment systems under different constraints.

In order to evaluate the present method—learning to assign (L2A), it was used the previously proposed testbed.

All methods are tested in the eight variants, under varied batch sizes and capacity constraints, thus ensuring the robustness of results. The variants are referenced by the shortened names presented in Table 1. As stated previously, the optimization objective is to maximize recall at 5% false positive rate (FPR). The human capacity constraints must be respected by every solution.

In every variant, the assignment system's training set was split into train and validation. Note that every training set is different, and will result in different models and assignment systems. The first three months were used for training, and leave the fourth month for validation. Data is split chronologically, since with concept drift, the latest data is expected to best represent future data.

As an example, rejection learning was used as a baseline, where decisions of high model uncertainty are deferred to humans. In particular, the rejection band solution previously introduced was used, as it is most adequate for unbalanced binary classification. If a decision is deferred, the attribution to a specific human is done randomly. Learning to defer cannot be implemented in this setting, since it requires concurrent human predictions for every training instance, and cannot optimize assignments under capacity constraints.

In them, the quality of human expertise modelling was evaluated, performance under a cost-sensitive learning paradigm, performance under Neyman-Pearson criteria, and, finally, performance under fairness constraints.

This testing method, contrary to rejection learning, performs assignments by comparing the performance of humans and AI. To that end, we propose using supervised learning to model the probability of error of humans. For this experiment, the target is multiclass: $y \in \{TP, FP, FN, TN\}$. All binary classification outcomes are modelled, since the optimization goal is cost-sensitive (recall at 5% FPR). We assess the predictive power of our human expertise model under the eight variants of the testbed.

The results herein presented are obtained from the validation set. The testbed test split represents deployment data, where humans have to be queried for decisions. As such, it does not make sense to evaluate the human expertise model there. Table 2 describes the statistics obtained by the best model in each variant on the validation set. Note that each training set and validation set are—one of our goals is to observe if difficulty changes with the variant.

TABLE 2

Human expertise model results on the validation set.

| | Average | FP | FN |
|---|---|---|---|
| S-R | 0.2524 | 0.1863 | 0.0291 |
| S-S | 0.2524 | 0.1870 | 0.0294 |
| S-D | 0.2554 | 0.1867 | 0.0311 |
| S-I | 0.2526 | 0.1864 | 0.0282 |
| L-R | 0.2540 | 0.1865 | 0.0288 |
| L-S | 0.2554 | 0.1870 | 0.0311 |
| L-D | 0.2530 | 0.1864 | 0.0303 |
| L-I | 0.2527 | 0.1864 | 0.0303 |

As expected, changing the batch size from small ("S-") to large ("L-") does not harm predictive performance, as it does not change the availability of data. However, surprisingly the settings, where only 20% of data contains a prediction from a human ("-S"), performance is not harmed. Even though the model's training set is reduced from 50% of data (253,060 instances) to 20% of data (101,226 instances), this does not affect performance. This may be due to the fact that our experts are synthetic, being identically distributed in any subset of data. Moreover, it may be the result of data abundance: even in the human-scarce variants ("-S"), there are, on average, 2,025 predictions per human.

Another takeaway from the results in Table 1 is that it is harder to predict false negatives than to predict false positives. This is a direct cause of the coefficients of the synthetic experts, which had to be arbitrarily set. Nevertheless, this does not impact the validity of rankings of assignment systems, which is the primary goal of the testbed.

The goal stated by the experimental setup is to maximize recall subject to keeping FPR below 5% (Neyman-Pearson criterion). However, optimization goals in binary classification are often to minimize a cost-sensitive loss $\mathcal{L} = \lambda FP + FN$, where the weight parameter $\lambda$ is provided. Herein, it is evaluated how the system performs in cost-sensitive learning, using RL as a baseline. Some key architectural choices were also tested, namely whether calibrating the main classifier's score helps in gauging its error probability and whether using linear programming as a solver improves significantly upon a greedy approach. The $\lambda$ parameter is set to the theoretical value that aligns the cost-sensitive optimization goal with the testbed's Neyman-Pearson criterion. Perfect alignment is not guaranteed, however, this should not affect the ranking of results.

L2A was tested on the validation set, deciding on the best architecture according to predicted loss. Note that on the validation set, obtained from the testbed training set, there is only one human prediction per instance. As such, on the validation set, the loss is predicted according to the error probability model. This methodology does not require querying humans for extra predictions, thus being the most sensible modus operandi for the validation phase. Optionally, on test set, a human classifier is queried for final results. There, the best L2A architecture is compared with the RL baseline.

TABLE 3

Cost-sensitive learning (loss minimizing). Predicted results of rejection learning (RL) versus learning to assign (L2A) on the validation set. It summarized prediced reults on the validation set, averaged between the eight variants, and sorted by loss.

| Method | Calibration | Assigner | $\mathcal{L}\downarrow$ |
|---|---|---|---|
| RL | — | — | 874.55 |
| L2A | True | Greedy | 724.80 |
| L2A | False | Greedy | 693.63 |
| L2A | False | Batch-based | 548.94 |
| L2A | True | Batch-based | 507.27 |

Figure 6:
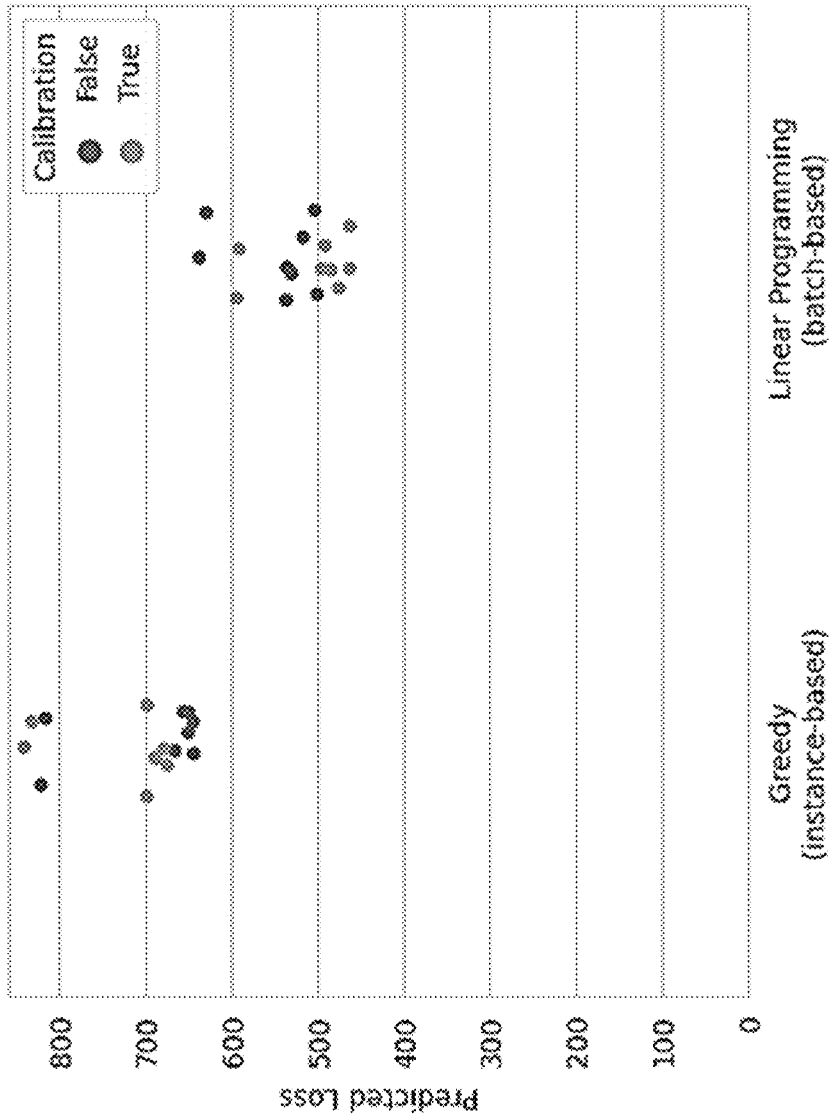
FIG. 6 illustrates a graphical representation of the cost-sensitive learning validation set results, in accordance with an example implementation of the present disclosure.

FIG. 6 shows a graphical representation of the cost-sensitive learning validation set results (loss minimizing). Predicted loss on the validation set. Each point represents results on a testbed variant.

FIG. 6 illustrates the results, facilitating analysis. From these results, the first evidence is obtained that the method does indeed improve upon the rejection learning baseline. By modelling human probability of error, it is possible to significantly reduce the predicted loss on the validation set. Furthermore, using (batch-based) linear programming to minimize the loss across each batch, subject to capacity constraints, improves upon greedy instance-by-instance assignment. The greedy assigner always chooses the best available decision-maker, disregarding the impact that that might have on future assignments. Calibration improves the results of the batch-based assigner, but is not helpful for the greedy assigner. Based on these results, L2A is implemented with the linear programming batch-based assigner and calibrated model scores.

TABLE 4

Cost-sensitive learning tests set results (minimizing loss). Test set performance of full automation, rejection learning, and learning to assign.

| Method | $\mathcal{L}\downarrow$ | TPR | FPR | PPR Parity |
|---|---|---|---|---|
| Full Automation | 765.26 | 0.5448 | 0.0754 | 0.3940 |
| Rejection Learning | 721.28 | 0.5625 | 0.0631 | 0.3875 |
| Learning to Assign | 487.29 | 0.7261 | 0.0629 | 0.3655 |

Table 4 presents the results of rejection learning and the best architecture of L2A on the test set. The results of full automation are also presented, in order to assess the benefit of human-AI collaboration. Full automation is denoted in italics, to highlight that it does not respect the capacity constraints of the testbed. Results in the test set confirm the conclusions taken from the validation set: L2A significantly reduces loss when compared with rejection learning, which does not individually model humans.

The performance was tested through a cost-sensitive lens: a cost structure is provided and the goal is to optimize a corresponding loss. Nevertheless, the testbed's goal is not stated in those terms. Instead, it uses a Neyman-Pearson criterion: the goal is to maximize recall subject to keeping the FPR under 5%. To optimize such criterion, L2A requires its λ parameter to be validated, in order to obtain a value that matches the FPR constraint. This does not require querying humans for decisions: instead, it is proposed optimizing for predicted metrics on the validation set, using the error probability models. Knowing that the theoretical $\lambda=0.016$, and that the mean predicted FPR at this level is around 8% (higher than the target 5%), it was experimented a dense grid centered above this value. In this document, this allows to provide a complete visualization of the relationship between λ and the FPR.

In an embodiment, the searching for the optimal λ is performed with a principled approach, such as Bayesian optimization or linear extrapolation.

Figure 7:
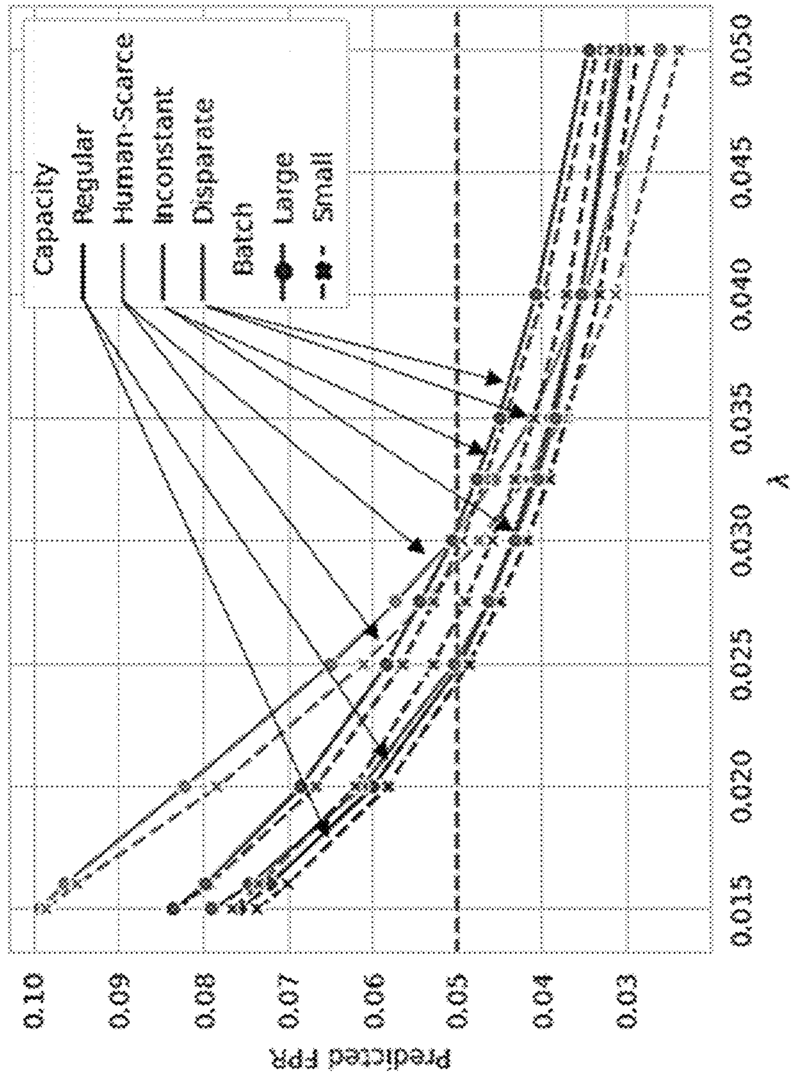
FIG. 7 shows a graphical representation of the predicted FPR for three values of $\lambda$, in accordance with an example implementation of the present disclosure.

FIG. 7 shows a graphical representation of the predicted FPR for three values of λ.

As λ increases, it becomes more costly to incur in a false positive. As a result, the predicted FPR decreases. Since the optimization is a recall at 5% FPR, the validation set predicted results were used to choose the value of λ in each variant. Keeping the value that yields a predicted FPR below 5% but as close to it as possible.

Table 5 summarizes the result of using these λ values in the test set, averaged across the eight variants. Before comparing the results between methods, it is important to note that the FPR values are significantly different from the target of 5%. In dynamic environments, this is to be expected, as there may be concept drift, or a shift in the prevalence of the target. Nevertheless, it is still possible to observe that L2A achieves better results than rejection learning, as recall (TPR) significantly increases, and the FPR is lower.

TABLE 5

Test set performance of full automation, rejection learning, and learning to assign.

| Method | TPR | FPR | EPR Parity |
|---|---|---|---|
| Full Automation | 0.5448 | 0.0754 | 0.3940 |
| Rejection Learning | 0.5625 | 0.0631 | 0.3875 |
| Learning to Assign | 0.6612 | 0.0363 | 0.3423 |

As an example, previously the FPR parity of every assignment solution was presented along with other metrics. Values for that metric had small variations between assignments, always being around 40%—older customers are 2.5× more likely to be wrongly accused of fraud than younger customers. This has a negative effect, e.g., barring seniors from access to a bank account.

As explained herein, L2A adds a term to its loss function in order to allow for optimization of a fairness metric. This term is weighted by a constant α. For each value of α, we test a grid of values of λ, and choose the one that results in a predicted FPR closer to but below 5%. Increasing α leads to an increase in the FPR parity metric. This increase comes at a cost of a slight decrease in recall in all variants, except in those where the human capacity for work is scarce, where recall drops significantly. This is a known phenomenon within the study of unfairness-mitigating machine learning techniques, referred to as the fairness-performance trade-off.

Figure 8:
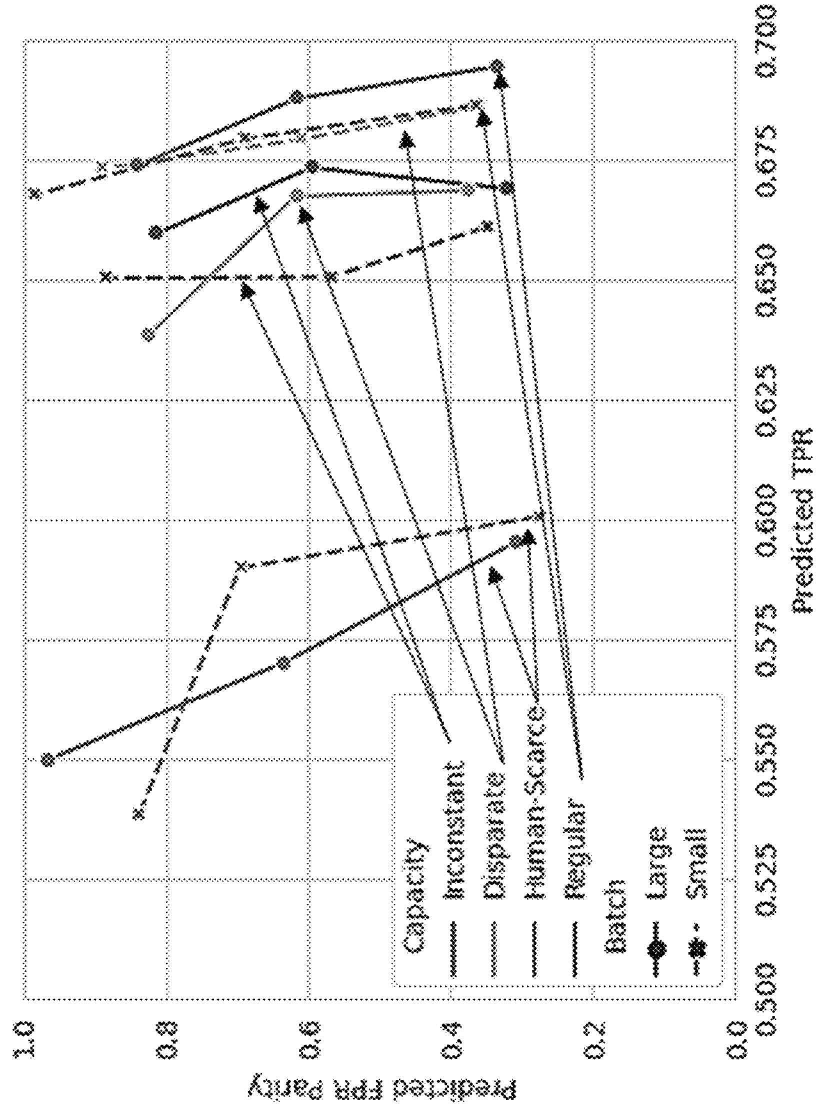
FIG. 8 shows a of the predicted recall TPR and FPR parity for varying values of $\alpha$, in accordance with an example implementation of the present disclosure.

FIG. 8 shows a graphical representation of the predicted recall TPR and FPR parity for varying values of α.

TABLE 6

Performance and fairness of full automation, rejection learning, and learning to assign on the test set.

| Method | α | TPR | FPR | FPR Parity |
|---|---|---|---|---|
| Full Automation | — | 0.5448 | 0.0754 | 0.3940 |
| Rejection Learning | — | 0.5625 | 0.0631 | 0.3875 |
| Learning to Assign | 0.00 | 0.6612 | 0.0363 | 0.3423 |
| Learning to Assign | 0.01 | 0.6554 | 0.0352 | 0.6446 |
| Learning to Assign | 0.02 | 0.6320 | 0.0319 | 0.8649 |

Table 6 displays results on the test set, averaged across the eight variants. The same fairness-performance trade-offs can be observed there. Nevertheless, the fairness intervention does not seem to significantly alter the FPR constraint violation—FPR values stay between 3.2% and 3.6%, while FPR parity increases from 0.34 to 0.86.

Figure 9:
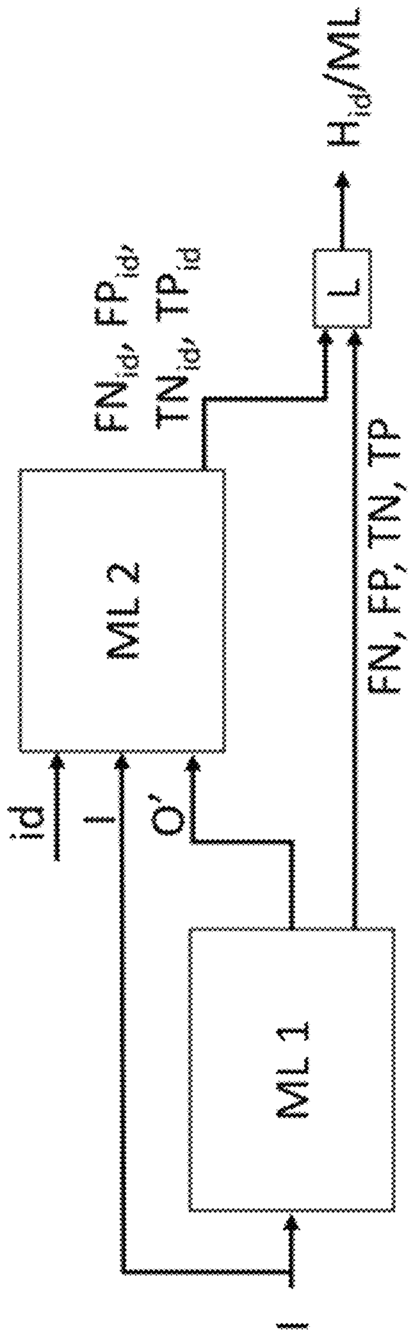
FIG. 9 shows a flowchart representation of a method including second machine-learning model receiving one or more identifiers of one or more constraint-limited classifiers as a machine-learning feature, in accordance with an example implementation of the present disclosure.

FIG. 9 shows a flowchart representation of a method wherein the second machine-learning model receives one or more identifiers of one or more constraint-limited classifiers as a machine-learning feature.

Figure 10:
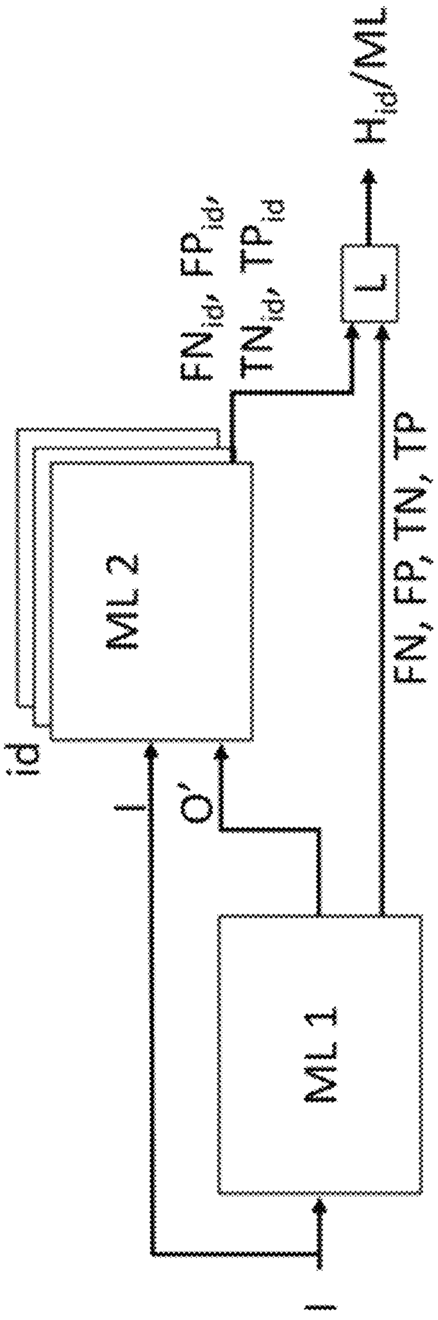
FIG. 10 shows a flowchart representation of a method including a second machine-learning model comprising a plurality of sub-models.

FIG. 10 shows a flowchart representation of a method wherein the second machine-learning model comprises a plurality of sub-models. Namely, wherein inputting the one or more identifiers of the one or more constraint-limited classifiers to the second machine-learning model comprises selecting a respective sub-model.

Existing benchmarks used to test assignment methods lack nuance, often relying on simulation techniques dependent on a single feature or concept. Thus, a testbed based on a novel human simulation technique where precision stochastically depends on several features is presented. The testbed also enforces human capacity constraints, common in real-world performative settings. L2A was tested on this testbed, and show that it improves significantly over the rejection learning (RL) baseline. Furthermore, it is shown how learning to assign can be used to promote fairness by explicitly modelling the biases of humans and AI.

The term "comprising" whenever used in this document is intended to indicate the presence of stated features, integers, steps, components, but not to preclude the presence or addition of one or more other features, integers, steps, components, or groups thereof.

The disclosure should not be seen in any way restricted to the implementations described and a person with ordinary skill in the art will foresee many possibilities to modifications thereof. The above-described implementations are combinable.

The following claims include these and further set out particular implementations of the present disclosure.

The invention claimed is:

1. A computer-implemented machine-learning method, the method comprising:

receiving, by one or more computing devices, one or more training instances for training a target machine-learning model;

inputting, by the one or more computing devices to a first machine-learning model, the received one or more training instances;

receiving, by the one or more computing devices from the first machine-learning model, for each of the one or more training instances, one or more respective classification prediction outputs and one or more respective error prediction outputs, wherein the one or more respective error prediction outputs of the first machine-learning model include an output representing one or more of a false-negative, a false-positive, a true-negative, and a true-positive;

inputting, by the one or more computing devices to a second machine-learning model, the received one or more training instances, the one or more respective classification prediction outputs, and one or more identifiers of one or more constraint-limited classifiers;

receiving, by the one or more computing devices from the second machine-learning model, for each of the received one or more training instances and each of the one or more constraint-limited classifiers, one or more respective error prediction outputs wherein the one or more respective error prediction outputs of the second machine-learning model include an output representing one or more of a false-negative, a false-positive, a true-negative, and a true-positive;

obtaining, by the one or more computing devices, a composite loss-function from:

a loss function for a constraint-unlimited machine-learning classifier using the one or more respective error prediction outputs for the received one or more training instances from the first machine-learning model; and a loss function for each of the one or more constraint-limited classifiers using the predicted error for the received one or more training instances from the second machine-learning model; and assigning, by the one or more computing devices, the received one or more training instances to the constraint-unlimited machine-learning classifier or to one or more constraint-limited classifiers, thereby minimizing the composite loss function.

2. The method of claim 1, wherein the loss function for each of the one or more constraint-limited classifiers includes one or more function terms for constraints of the constraint-limited classifiers.

3. The method of claim 1, wherein the one or more constraint-limited classifiers are capacity-constrained and the constraint-unlimited machine-learning classifier is capacity-unconstrained, and further wherein a capacity-constraint is a maximum value of classified instances per time period, including a minute, hour, day, week, month and/or year.

4. The method of claim 1, wherein the second machine-learning model includes a plurality of sub-models, each of the plurality of sub-models for each of the one or more constraint-limited classifiers, and further wherein inputting the one or more identifiers of the one or more constraint-limited classifiers to the second machine-learning model comprises:

selecting, by the one or more computing devices, a respective sub-model, wherein the selected sub-model is selected for inputting the received one or more training instances, and the predicted classification for the received one or more training instances by the first machine-learning model, and the selected sub-model is selected for outputting a predicted error for the received one or more training instances for each of the one or more constraint-limited classifiers.

5. The method of claim 1, wherein the one or more training instances is a single training instance.

6. The method of claim 1, wherein each of the constraint-limited classifiers is an aggregation of individual constraint-limited classifiers.

7. The method of claim 1, further comprising initializing three deployment stages of:

training, by the at least one computing device, the first machine-learning model using classifications provided by one or more constraint-limited classifiers or ground-truth classifications; and training, by the at least one computing device, the second machine-learning model using classification errors of classifications provided by one or more constraint-limited classifiers when supplied with classifications provided by the trained first machine-learning model;

assigning, by the one or more computing devices, the received one or more training instances to the constraint-unlimited machine-learning classifier or to one or more constraint-limited classifiers, thereby minimizing the composite loss function.

8. The method of claim 1, wherein the first machine-learning model is pretrained to output a predicted classification; and further comprising:

comparing, for each of one or more training instances and for each of the one or more constraint-limited classifiers, the error prediction outputs from the second machine-learning model against a ground-truth classification error made by the one or more constraint-limited classifiers, for obtaining a comparison error;

backpropagating the comparison error for training the first machine-learning model.

9. The method of claim 1, wherein the target machine-learning model is the first machine-learning model.

10. The method of claim 1, wherein the error is a classification error associated with a machine-learning model performance error combined with a machine-learning model disparate predictive error across sub-groups of a population, in particular unbalanced sub-groups of a population.

11. The method of claim 1, wherein the loss function is a linear sum of the probability of a true positive (TP), true negative (TN), false positive (FP), false negative (FN), each with an associated weight, preferably the linear sum being obtained using a confusion matrix of costs.

12. The method of claim 1, wherein the loss function is defined as $\mathcal{L}=\lambda\hat{P}(FP)+\hat{P}(FN)+\alpha Z\hat{P}(FP)$, wherein $\hat{P}(FP)$ is a probability of predicting false positive, $\hat{P}(FN)$ is a probability of predicting false negative, a is a pre-defined constant associated with a fairness metric, and $Z \in -1,1$ where $Z=1$ for a protected population sub-group or $Z=-1$ for every other population sub-group, and $$\lambda = \frac{c_{01} - c_{11}}{c_{10} - c_{00}}$$

obtained from confusion matrix c.

13. A computer-implemented machine-learning training system, the system comprising:

at least one computing device, configured to access instructions stored on non-transitory processor readable media, wherein the instructions, when executed by the at least one computing device cause the at least one computing device to:

receive one or more training instances for training a target machine-learning mode;

input to a first machine-learning model, the received one or more training instances;

receive from the first machine-learning model, for each of the one or more training instances, one or more respective classification prediction outputs and one or more respective error prediction outputs, wherein the one or more respective error prediction outputs of the first machine-learning model include an output representing one or more of a false-negative, a false-positive, a true-negative, and a true-positive;

input to a second machine-learning model, the received one or more training instances, the one or more respective classification prediction outputs, and one or more identifiers of one or more constraint-limited classifiers;

receive from the second machine-learning model, for each of the received one or more training instances and each of the one or more constraint-limited classifiers, one or more respective error predicted outputs wherein the one or more respective error prediction outputs of the second machine-learning model include an output representing one or more of a false-negative, a false-positive, a true-negative, and a true-positive;

obtain a composite loss-function from:

a loss function for a constraint-unlimited machine-learning classifier using the one or more respective error prediction outputs for the received one or more training instances from the first machine-learning model; and a loss function for each of the one or more constraint-limited classifiers using the predicted error for the received one or more training instances from the second machine-learning model; and assign the received one or more training instances, to the constraint-unlimited machine-learning classifier or to one or more constraint-limited classifiers, thereby minimizing the composite loss function.

14. The system of claim 13, wherein the loss function for each of the one or more constraint-limited classifiers includes one or more function terms for constraints of the constraint-limited classifiers.

15. The system of claim 13, wherein the one or more constraint-limited classifiers are capacity-constrained and the constraint-unlimited machine-learning classifier is capacity-unconstrained, and further wherein a capacity-constraint is a maximum value of classified instances per time period, including a minute, hour, day, week, month and/or year.

16. The system of claim 13, wherein the second machine-learning model includes a plurality of sub-models, each of the plurality of sub-models for each of the one or more constraint-limited classifiers, and further wherein inputting the one or more identifiers of the one or more constraint-limited classifiers to the second machine-learning model comprises:

selecting a respective sub-model, wherein the selected sub-model is selected for inputting the received one or more training instances, and the predicted classification for the received one or more training instances by the first machine-learning model, and the selected sub-model is selected for outputting a predicted error for the received one or more training instances for each of the one or more constraint-limited classifiers.

17. The system of claim 13, wherein the one or more identifiers of one or more constraint-limited classifiers is a machine-learning feature of the second machine-learning model.

18. The system of claim 13, wherein each of the constraint-limited classifiers is an aggregation of individual constraint-limited classifiers.

19. The system of claim 13, wherein the first machine-learning model is pretrained to output a predicted classification, and further wherein the instructions, when executed by the at least one computing device, cause the at least one computing device to:

compare, for each of one or more training instances and for each of the one or more constraint-limited classifiers, the error prediction outputs from the second machine-learning model against a ground-truth classification error made by the one or more constraint-limited classifiers.

20. The system of claim 13, wherein the error is a classification error and associated with a machine-learning model performance error combined with a machine-learning model disparate predictive error across sub-groups of a population, including unbalanced sub-groups of a population.

* * * * *